(12) United States Patent
Rosa et al.

(10) Patent No.: US 9,464,215 B2
(45) Date of Patent: Oct. 11, 2016

(54) USE OF A KETAL AS A SOLVENT IN ADHESIVES AND KETAL-CONTAINING ADHESIVE COMPOSITION

(71) Applicant: OXITENO S.A. INDÚSTRIA E COMÉRCIO, São Paulo-SP (BR)

(72) Inventors: Fábio Rosa, Santo André-SP (BR); Carlos Roberto Tomassini, Santo André-SP (BR); Juliane Pereira dos Santos, Santo André-SP (BR); Luis Henrique de Freitas, Ipiranga-SP (BR); Emerson Venceslau, Vila Santo Estéfano-SP (BR)

(73) Assignee: Oxiteno S.A. Industria E Comercio, Sao Paulo (BR)

( * ) Notice: Subject to any disclaimer, the term of this patent is extended or adjusted under 35 U.S.C. 154(b) by 65 days.

(21) Appl. No.: 14/404,810

(22) PCT Filed: May 13, 2013

(86) PCT No.: PCT/BR2013/000166
§ 371 (c)(1),
(2) Date: Dec. 1, 2014

(87) PCT Pub. No.: WO2013/177641
PCT Pub. Date: Dec. 5, 2013

(65) Prior Publication Data
US 2015/0152296 A1 Jun. 4, 2015

(30) Foreign Application Priority Data

Jun. 1, 2012 (BR) ............................ 102012013353

(51) Int. Cl.
| | |
|---|---|
| *C09J 111/00* | (2006.01) |
| *C09J 11/06* | (2006.01) |
| *C08J 3/09* | (2006.01) |
| *C08K 3/22* | (2006.01) |
| *C08K 5/00* | (2006.01) |
| *C08K 5/1565* | (2006.01) |

(52) U.S. Cl.
CPC ............. *C09J 111/00* (2013.01); *C08J 3/095* (2013.01); *C08K 3/22* (2013.01); *C09J 11/06* (2013.01); *C08J 2311/00* (2013.01); *C08K 5/005* (2013.01); *C08K 5/1565* (2013.01); *C08K 2003/222* (2013.01); *C08K 2003/2217* (2013.01); *C08K 2003/2296* (2013.01)

(58) Field of Classification Search
CPC . C09J 111/00; C09J 11/06; C08K 2003/222; C08K 2003/2296; C08K 5/1565; C08K 2311/00; C08J 3/095
USPC ......................................................... 524/108
See application file for complete search history.

(56) References Cited

U.S. PATENT DOCUMENTS

| | | | |
|---|---|---|---|
| 5,773,113 A | 6/1998 | Akhter | |
| 6,469,082 B1 * | 10/2002 | Raymond | ............... C09J 111/00 524/273 |

FOREIGN PATENT DOCUMENTS

| | | |
|---|---|---|
| JP | H0827448 A | 1/1996 |
| JP | 2012126888 A | 7/2012 |

OTHER PUBLICATIONS

Search Report for PCT/BR2013/000166, dated Aug. 13, 2013.

\* cited by examiner

*Primary Examiner* — Susannah Chung
*Assistant Examiner* — Josephine Chang
(74) *Attorney, Agent, or Firm* — Kilpatrick Townsend & Stockton LLP

(57) ABSTRACT

The present invention relates to the use of a cyclic ketal, 2-methyl-2-ethyl-1,3-dioxolane as a solvent in adhesives, as well as an adhesive composition comprising said ketal. 2-Methyl-2-ethyl-1,3-dioxolane has high solubilization power of the polychloroprene polymer, forming solutions having high viscosity and having suitable drying time after application of a film onto a surface. Due to the good technical performance, the adhesive composition made according to the present invention is well accepted in the market, finding use to substitute compositions containing toluene or other aromatic and oxygenated solvents.

5 Claims, No Drawings

USE OF A KETAL AS A SOLVENT IN ADHESIVES AND KETAL-CONTAINING ADHESIVE COMPOSITION

FIELD OF THE INVENTION

The present invention relates to solvent-based adhesives. Specifically, this invention describes the use of a ketal as a solvent in adhesives, as well as an adhesive composition comprising said ketal.

BACKGROUND OF THE INVENTION

Adhesives can be defined as compositions that join discrete materials or materials of the same nature, conferring to the final assembly new functions and improved properties over those of the isolated components. Herein, the designation "adhesives" encompasses contact adhesives, such as glues and sealants, as well as any and all compositions capable of being applied onto a substrate in the form of a thin film having as a primary function to join surfaces.

Adhesives may present themselves in the form of compositions, usually in the form of a high viscosity liquid solution made of one or more polymers dissolved into solvents and they can also contain additives. Adhesives are broadly used in different industrial fields, such as automotive, aviation, paper, electro-electronics, furniture, leather/shoes and construction. The use of adhesives provides several advantages over other joining processes, such as joining between materials having variable composition and dimension and with any type of surface, reduction of the occurrence of electrochemical corrosion between different materials, thermal and electrical insulation, and dampening of vibration and shock.

Adhesives, especially those classified as solvent-based contact adhesives promote a remarkable reduction in the assembly time and costs over other processes such as welding, weaving or mechanical splice (with rivets, bolts and spikes) used in the industry of wood products in general, shoes, carpets, construction, among others. An example of this type of adhesive is that known in the market as "shoemaker's glue".

From among the most used polymers in solvent-based contact adhesive compositions, polychloroprene (2-chloro-1,3-butadiene), which is used in the manufacture of synthetic rubbers, can be mentioned. Polychloroprene is obtained by polymerization of the chloroprene monomer and unlike the further elastomers, it can be vulcanized with magnesium oxide. In general, polychloroprene has good chemical stability and retains flexibility over a broad temperature range.

The solvent that is more commonly used in adhesive compositions, especially those containing polychloroprene, is toluene (methyl benzene). Preference for toluene is due to some characteristics of the polychloroprene solution in said solvent, especially high viscosity and slow evaporation after application of a film onto a surface. However, toluene is an aromatic solvent popularly known in Brazil as the toxic component of the shoemaker's glue. Inhalation thereof can lead to addiction and said solvents are known to cause several damages to the organism, especially to the nervous system, causing symptoms such as fatigue, nausea, mental confusion, weakness and loss of memory, appetite, hearing and vision and even loss of consciousness and death.

In order to prevent the problems caused by toluene, novel adhesive compositions employing different solvents have been proposed. An example is Brazilian patent PI9901812-8, which suggests a toluene-free, polychloroprene-containing adhesive composition that uses a cyclic hydrocarbon (cyclo hexane) as a main solvent, but such solvent does not provide the composition with high viscosity and an appropriate drying time at levels similar to those of the toluene-containing compositions.

U.S. Pat. No. 6,469,082 describes low VOC contact adhesive compositions containing polychloroprene solubilized in a blend of solvents comprising approximately 10% cyclohexane, 60% of acetone, 20% of methyl acetate and 10% of toluene. Viscosity levels of compositions containing 20 to 40% solids suggest that the used solvent blend confers high viscosity only as a function of the increase in the amount of solids in the polychloroprene or adhesive solution.

As noted in the aforementioned inventions, the adhesive compositions free of toluene or having a low content of toluene exhibit limitations such as low viscosity of the polychloroprene polymer solution and fast drying of a film of the solution applied onto a surface. Thus, one notes that the field of the invention still allows for one to obtain adhesive compositions with improved formulations.

In experiments intended to assess the solubility of polymers for rheology studies, it has been surprisingly found that the use of a cyclic ketal, 2-methyl-2-ethyl-1,3-dioxolane, was capable of solubilizing polychloroprene. Subsequent tests have shown that this ketal yields adhesive compositions having viscosity and drying characteristics that enable the use thereof as an alternative to compositions containing toluene and further aromatic and oxygenated solvents. The molecule of this cyclic ketal is known but the search for prior-art documents did not show any inventions anticipating the use thereof as a solvent in adhesives.

Thus, it is an object of the present invention to use 2-methyl-2-ethyl-1,3-dioxolane as a solvent in adhesive compositions. It is another object of the invention an adhesive composition comprising 2-methyl-2-ethyl-1,3-dioxolane as a solvent. The advantages of the present invention will be evident from the following detailed description.

BRIEF DESCRIPTION OF THE INVENTION

The present invention relates to the use of a cyclic ketal, 2-methyl-2-ethyl-1,3-dioxolane as a solvent in adhesives, as well as an adhesive composition comprising said ketal. 2-Methyl-2-ethyl-1,3-dioxolane has high solubilization power of the polychloroprene polymer, forming solutions having high viscosity and having suitable drying time after application of a film onto a surface. Due to the good technical performance, the adhesive composition made according to the present invention is well accepted in the market, finding use to substitute compositions containing toluene or other aromatic and oxygenated solvents.

DETAILED DESCRIPTION OF THE INVENTION

The cyclic ketal referred to by this invention is 2-methyl-2-ethyl-1,3-dioxolane, having the following structural formula:

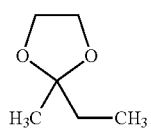

Said ketal is characterized by having a structure containing a dioxolane ring with two alkyl groups in a crossed position and bonded to the carbon-2. The main physicochemical properties of this ketal are depicted in Table 1.

TABLE 1

Physicochemical properties of 2-methyl-2-ethyl-1,3-dioxolane

| Property | Value |
| --- | --- |
| Boiling point (° C.) | 116.2 |
| Freeze Point (° C.) | −33.3 |
| Density (cm$^3$/ml) | 0.916 |
| Water solubility (mg/L) | 3.256 |
| Flash point (closed vessel) | 12.8° C. |
| Evaporation rate (n-Butyl Ac. = 100) | 152 |
| Hansen solubility parameters | dD (dispersion) = 2 |
| | dP (polarity) = 2 |
| | dH (hydrogen bonding) = 2 |

Data of table 1 is not sufficient to suggest that 2-methyl-2-ethyl-1,3-dioxolane can be used as a solvent in adhesives in place of aromatic or oxygenated compounds and Figure 1 clearly indicates that the structure of this ketal differs from that of toluene and other solvents commonly used to this ende use. Therefore, the assessment that 2-methyl-2-ethyl-1,3-dioxolane has suitable properties for the application described herein is an improvement over the art.

The ketal used in the invention is not listed as carcinogenic by any of several environmental agencies, such as IARC (International Agency for Research on Cancer), NTP (National Toxicology Program-USA), OSHA (Occupational Safety and Health Administration-USA) and ACGIH (American Conference of Governmental Industrial Hygienists) (Available at http://www.chemcas.com/material/cas/archive/126-39-6.asp, accessed in May, 2012).

Table 2 depicts some of the main toxicological information on 2-methyl-2-ethyl-1,3-dioxolane.

TABLE 2

Toxicological information on 2-methyl-2-ethyl-1,3-dioxolane.

| Trial | Value | References |
| --- | --- | --- |
| LD50$^a$ (oral rat) - µL/kg | 2,830 | American Industrial Hygiene Association Journal. 23 (1962), 95. |
| DL50 (dermal rabbit) - mL/kg | 10 | Toxinet - U.S. National Library of Medicine |
| LCLo/4 H$^b$ (inhalation rat) - ppm/4 H | 4,000 | AIHAAP - American Industrial Hygiene Association Journal. 23 (1962), 95. |
| LCLo/24 H$^c$ (skin rash - rabbit)-mg/24 H | 500 | 85JCAE Prehled Prumyslove Toxikologie; Organicke Latky Marhold, J., Prague, Czechoslovakia.: Avicenum, 1986, 797. |
| LCLo/24H (eye irritation - rabbit)-mg/24 H | 500 | 85JCAE Prehled Pmmyslove Toxikologie; Organicke Latky Marhold, J., Prague, Czechoslovakia: Avicenum, 1986, 797. |

$^a$Dose capable of killing 50% of the subjects in a test population.
$^b$Minimal lethal concentration for a period of 4 hours of exposure.
$^c$Minimal lethal concentration for a period of 24 hours of exposure.

Another advantageous feature of the ketal of this invention concerns the preparation thereof, which can be made by means of a known reaction between a polyol and a ketone using acid catalysts, as described in U.S. Pat. No. 5,917,059. The process can be carried out continuously or batch-wise, the latter being more frequent and requiring removal of water. It can be made using a water scavenger (azeotropic agent) to reduce the reaction time and to prevent the chemical equilibrium concentration from being achieved.

2-Methyl-2-ethyl-1,3-dioxolane is a solvent of average evaporation that has solubility parameters that are consistent with a diversity of resins, such as acrylic, epoxy, phenolic, melamine resins, among others. These characteristics represent additional advantages of the present invention and enable the use of this ketal in adhesive compositions for different applications.

A typical adhesive composition may contain one or more resins, solvent polymers, oxides and antioxidants. Oxides are classified as additives and function to aid in curing (vulcanizing) the polychloroprene, causing the state of the crude compound (plastic) to change to vulcanized (elastic). Antioxidants prevent the polymers and resins from reacting with oxygen, ozone and other reactive substances that cause destruction thereof.

In a first embodiment, the present invention relates to the use of a ketal as a solvent in adhesives, particularly for imparting suitable viscosity and drying time to adhesive compositions, characterized in that it is 2-methyl-2-ethyl-1,3-dioxolane ketal and it is present in a ratio in the range of 5 to 90% based on the total weight of the composition, preferably between 20 and 60% by weight.

In another embodiment, the adhesive compositions of the present invention are contact adhesive compositions, being preferably adhesive compositions comprising polychloroprene, synthetic resins, or mixtures thereof. In a preferred embodiment, 2-methyl-2-ethyl-1,3-dioxolane is used as the main solvent of the polychloroprene comprising 60% by weight of the adhesive, based on the total of the composition, and synthetic resins are selected from acrylic resin, epoxy resin, phenolic resin, melamine resin or mixtures thereof. According to this invention, the ketal can be used together with other solvents, designated as secondary solvents or co-solvents, preferably belonging to the families of oxygenated solvents, such as ketones, esters, esters, alcohols, or aliphatic hydrocarbon solvents and/or cyclo-aliphatic hydrocarbons.

In a second preferred embodiment, the present invention is directed to a ketal-containing adhesive composition, characterized in that it comprises: from 10 to 30% of polychloroprene based on the total of the composition; from 2 to 10% synthetic resins; from 20 to 60% of 2-methyl-2-ethyl-1,3-dioxolane; from 20 to 60% of one or more co-solvents; from 1 to 3% of magnesium oxide; from 1 to 3% of zinc oxide; and from 0.5 to 1% of an anti-oxidizing agent.

A typical contact adhesive composition made according to the present invention is shown in Table 3.

TABLE 3

Example of a contact adhesive composition.

| Component | Weight Percent (based on the total of the composition) |
|---|---|
| Polychloroprene | 10 to 30% |
| Phenolic resin | 2 to 10% |
| 2-methyl-2-ethyl-1,3-dioxolane | 20 to 60% |
| One or more co-solvents | 20 to 60% |
| Magnesium oxide | 1 to 3% |
| Zinc oxide | 1 to 3% |
| Antioxidative | 0.5 to 1% |

In addition to being compatible with components commonly used in adhesive compositions, 2-methyl-2-ethyl-1,3-dioxolane provided the polychloroprene polymer solutions with unexpected characteristics that improve the performance of the compositions and help in the application of the technique, such as (i) gel formation and high viscosity of the solution, showing better applicability of the final adhesive, (ii) low time of solubilization of the polymer, showing that the production process is easy and (iii) high drying time to the touch of the applied film from the solution, similar to toluene, showing an excellent time interval for the application of contact adhesives.

The invention will now be described by means of the following examples, which are merely exemplary and should not be construed as a limitation on the scope of its scope.

Example 1

A polychloroprene solution was prepared in 2-methyl-2-ethyl-1,3-dioxolane at a concentration of 2% by weight of the polymer, which was allowed to rest for 24 hours. After this period, in addition to the complete solubilization of the polymer, the formation of a gel was seen, conferring low flowability to the solution. Gel formation usually takes place by using toluene or an aromatic hydrocarbon solvent, and was not expected in the case of oxygenated solvents, such as 2-methyl-2-ethyl-1,3-dioxolane.

Example 2

Polychloroprene solutions at 10 wt % were prepared in 2-methyl-2-ethyl-1,3-dioxolane and toluene, which were subjected to tests to study the time of solubilization of polychloroprene, the capacity for gel formation after solubilization, the viscosity of the solution and drying time to the touch after the formation of a film of the solution onto a surface. The solutions were stirred using a cowles-type disc at 150 rpm for a predetermined period of time and assays were carried out under the following conditions:

Room temperature=25° C.+/−1° C.;
Hourly assessment of the solubility of the solutions;
Viscosity measurement by recording the temperature of the solutions, the ambient temperature and relative humidity;
Assessment of the drying time to the touch of the polychloroprene solution films formed onto the glass plate using a 150 micrometer extender;
Viscoelasticity analysis (Weissemberg effect);

Table 4 compares results obtained with both solutions, and shows that the solution of polychloroprene in 2-methyl-2-ethyl-1,3-dioxolane showed equivalent results to those obtained with the solution in toluene, thereby allowing the use thereof as a surrogate for this solvent in adhesives.

TABLE 4

Comparison of the properties of polychloroprene solutions in toluene and 2-methyl-2-ethyl-1,3-dioxolane.

| Solution | Time of solubilization (hour) | Brookfield viscosity (cP, 25° C.) | Drying time (minutes, 25° C.) | Viscoelasticity (cm) |
|---|---|---|---|---|
| Polychloroprene in toluene | 6.00 | 5330.00 | 6.71 | 8.50 |
| Polychloroprene in 2-methyl-2-ethyl-1,3-dioxolane | 6.00 | 4390.00 | 6.87 | 8.00 |

The invention claimed is:

1. A ketal-containing contact adhesive composition comprising:
   5 to 90% of 2-methyl-2-ethyl-1,3-dioxalane ketal based on the total weight of the composition; and
   polychloroprene or a mixture of polychloroprene with synthetic resins.

2. The composition of claim 1, characterized in that the ketal is present in an amount of 60% based on the total weight of the composition.

3. The composition of claim 1, characterized in that the synthetic resins are acrylic resin, epoxy resin, phenolic resin, melamine resin or mixtures thereof.

4. A ketal-containing adhesive composition, comprising: from 10 to 30% of polychloroprene based on the total of the composition; from 2 to 10% synthetic resins; from 20 to 60% of 2-methyl-2-ethyl-1,3-dioxalane; from 20 to 60% of one or more co-solvents; from 1 to 3% of magnesium oxide; from 1 to 3% of zinc oxide; and from 0.5 to 1% of an anti-oxidizing agent.

5. The composition of claim 4, characterized in that the co-solvents belong to the families of oxygenated solvents, aliphatic hydrocarbons and/or cyclo-aliphatic hydrocarbons.

* * * * *